United States Patent [19]

Dorsz

[11] Patent Number: 4,674,983
[45] Date of Patent: Jun. 23, 1987

[54] RELATION TEACHING BLOCK ARRAYS

[76] Inventor: Edmund D. Dorsz, 5555 14 Mile Rd., Sterling Heights, Mich. 48311

[21] Appl. No.: 923,570

[22] Filed: Oct. 27, 1986

[51] Int. Cl.[4] .............................................. A63F 9/10
[52] U.S. Cl. ................................... 434/300; 434/171; 434/333
[58] Field of Search ............... 434/300, 195, 205, 333, 434/403, 176, 173, 172, 169; 446/102; 273/155

[56] References Cited

U.S. PATENT DOCUMENTS

| 845,798 | 3/1907 | Lehr | 273/155 |
|---|---|---|---|
| 2,022,627 | 11/1935 | Whitney | 434/172 |
| 2,317,206 | 4/1943 | Major | 434/195 |
| 2,481,058 | 9/1949 | Zarlengo | 434/205 |
| 3,593,431 | 7/1971 | Candido | 434/169 |
| 3,798,797 | 3/1974 | Mandel | 434/171 |
| 4,361,328 | 11/1980 | Stein et al. | 434/333 |

FOREIGN PATENT DOCUMENTS 607838 7/1946 United Kingdom ............... 446/102

Primary Examiner—William F. Pate, III
Assistant Examiner—Caroline D. Dennison
Attorney, Agent, or Firm—John R. Benefiel

[57] ABSTRACT

A tactile teaching aid is disclosed in which fixed and variable arrays of elongate members having end face patterns are adapted to be fit together only when the label terms also have a conceptual relationship match, to enable demonstration and reinforcement of the conceptual relationships by manipulation of the arrays.

4 Claims, 5 Drawing Figures

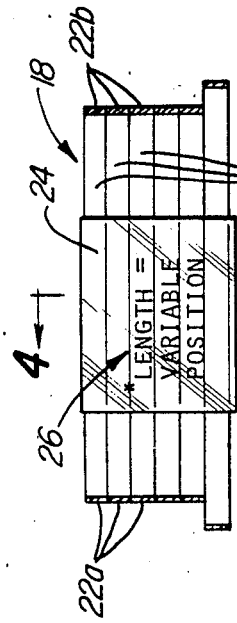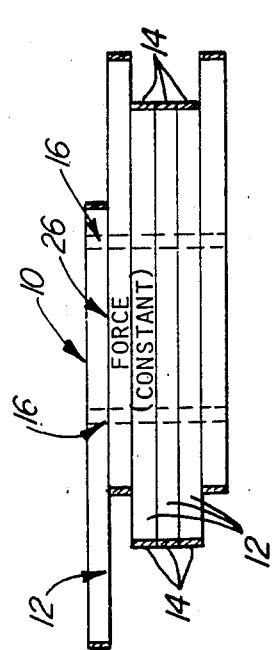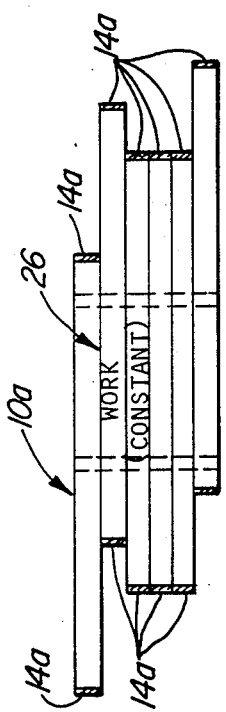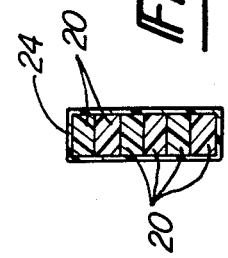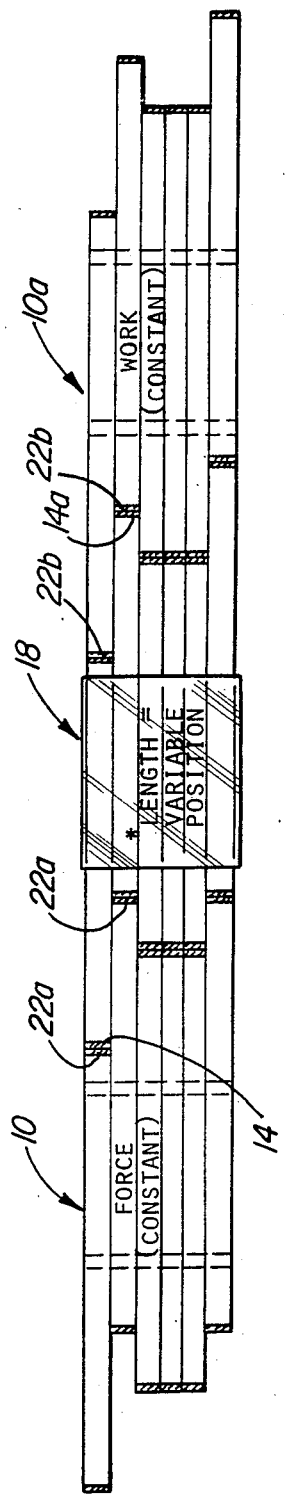

RELATION TEACHING BLOCK ARRAYS

FIELD OF THE INVENTION

This invention concerns teaching and educational devices and more particularly tactile devices for demonstrating relationships such as between various science parameters.

BACKGROUND OF THE INVENTION

It has been recognized that in teaching abstract concepts, it is often effective and useful to utilize visual and tactile aids in such a way as to reinforce understandings of such concepts.

See for an example, U.S. Pat. No. 4,158,921 to Stolper, for "Discovering by Manipulation" in which relationships are taught by interfitting blocks.

A primary area of application of such concept is in teaching relationships between physical parameters, such as force, distance, energy (i.e., work).

Certain of such parameters are mathematically related and such relationship may typically be set forth as an equation, i.e., Force times Distance equals Work, a mechanical form of energy.

It is an object of the present invention to provide tactile devices capable of teaching conceptual relationships which is particularly adaptable to demonstrating the mathematical relationships between scientific parameters.

SUMMARY OF THE INVENTION

The present invention comprises a pluarlity of fixed and variable arrays or sets of several elongated blocks or rods held together to create unique codings constituted by the staggered pattern formed by the ends of the blocks in each array.

In the fixed arrays, the blocks are in a fixed relationship, while in the variable arrays the blocks are slidable to be able to be fit to the ends of the blocks in a fixed array. The elongated blocks are of unequal length in the variable arrays, so as to provide a composite end face encoding when fit to a fixed array.

Each of the arrays are labelled with a parameter identification. The staggered end face patterns of the fixed arrays and offset lengths of the variable arrays are selected so that only those arrays labelled with parameters related to each other may be perfectly fit together, and unrelated arrays cannot be so fit together.

The interfitting is such as to produce a spatial ordering of the labels in correspondence with the mathematical relationships when correctly fit together, to provide a visual-tactile reinforcement of the conceptual relationship between the parameters set forth on the labels by manipulation of the blocks.

DESCRIPTION OF THE DRAWINGS

FIG. 1 is a side view of a fixed array of elongated blocks according to the present invention.

FIG. 2 is a side view of a variable array of elongated blocks according to the present invention.

FIG. 3 is a side view of another representative fixed array.

FIG. 4 is a view of the section 4—4 taken in FIG. 2.

FIG. 5 is a side view of a series of fixed and variable arrays interfit together to demonstrate a relationship of the parameters set forth on the array labels.

DETAILED DESCRIPTION

In the following detailed description, a specific example will be set forth and particular terminology employed for the sake of clarity, but it is to be understood that the same is not intended to be limiting and should not be construed as an intent to limit the invention, since the invention is contemplated as taking many forms and variations within the scope of the appended claims.

Referring to FIG. 1, a fixed array 10 is shown comprised of a plurality of elongated members 12 such as square rods or blocks, mounted together to extend parallel to each other, side by side.

The elongate members 12 each have end faces 14 on either end thereof, and being offset from each other, form a code constituted by the staggered position of the end faces at either end.

A suitable fastening is provided, as by a pair of locking pins 16 extending through all of the members 12 so that the lengthwise relative positions of the members 12 is fixed to thereby fix the end face patterns.

Each end face pattern is selected to establish a unique tactile code.

Also provided is one or more variable arrays 18, constructed as shown in FIG. 2.

The variable array 18 also comprises a plural number of elongate members 20, equal to the number in the fixed arrays 10 and also similarly configured as the members 12 of the fixed arrays, and are mounted together parallel and side by side. Each member 20 is provided with an end face 22 on either end, able to be fit to a corresponding end face 14 of a fixed array 10.

For this purpose, the members 20 in the variable array 18 are mounted within a band 24, as of clear plastic so as to enable sliding adjustment of the members 20 so that the end faces of one end of the array can be moved to match the staggered end pattern of any of the fixed arrays 10.

As shown in FIG. 4, the elongate members 12 and 20 of the fixed and variable arrays 10 and 18 are comprised of square in section rods, although other shapes may be used.

Variously labelled fixed arrays are contemplated such as the fixed array 10a shown in FIG. 3, labelled "Energy (Work)".

The length of elongated members 20 in the variable array 18 are not equal, so that when an end of faces 22a at one end of the variable array 18 are fitted to the end faces of one end of a fixed array 10, a differing end face pattern is formed by the end faces 22b of the other end of the variable array 18.

According to the concept of the present invention, this composite end face pattern is unique and able to be fit only to one end of another fixed array 10a, as shown in FIG. 5.

It is this code pattern matching which is utilized to properly match up terms set forth on labels 26 secured to each fixed and variable array 10 and 18 respectively.

In the example shown, the term "Force" is set out on one of the fixed arrays 10 to the left as shown, the variable array having one end fit to that fixed array 18 labelled with the term "Length", and the other fixed array 10a fit to the other end of the variable array 18 is labelled "Energy" (Work).

The staggered end face patterns are selected so that only those arrays may be fit together which have the proper relationship of the label terms.

Physical parameters having a mathematical relationship with each other are shown in the example of FIG. 5.

It is noted that the end face pattern also orders these terms in the proper order of the corresponding mathematical equation.

Only if the right end of the left hand fixed array 10 is fit to the left end of the variable array 18 can a match be made by the right end of the variable array 18 to the fixed array labelled "Energy (Work)".

Thus, corresponding to the equation:

$$F \times L = W$$

Accordingly, by practicing the interfitting between arrays, reinforcement of the conceptual relationship of the label terms is obtained.

It should be understood that the invention may have application to teaching relationships between any label terms, even those without any mathematical relationship.

I claim:

1. A tactile teaching aid comprising:
   a plurality of fixed arrays each array comprising similarly configured elongated members each having a parallel and side by side but with said end faces offset to be staggered, said members fixed together to thereby produce a code pattern constituted by said staggered end faces of said elongated members;
   at least one variable array comprised by a plural number of elongated members of unequal length, equal to said number of members in each of said fixed arrays, each of said members in said variable array having end faces on either end thereof, being configured and positioned similarly to said members in each of said fixed arrays to be able to have the end faces thereof fit to the end faces of the members of a fixed array;
   said variable array including means mounting said elongated members side by side together while enabling sliding adjustment therebetween to allow matching of one of the end faces of the member of said variable array to the end faces of the members of any of said fixed arrays;
   at least some of said fixed arrays having end face patterns matching the other of said end face of said variable array when said variable array has one end fitted to one of said fixed arrays.

2. The tactile teaching aid according to claim 1 wherein each of said fixed and variable arrays are labeled with descriptive terms properly related when said fixed and variable arrays are fitted together.

3. The tactile teaching aid according to claim 2 wherein said elongated members of said fixed and variable array comprise elongated blocks.

4. The tactile teaching aid according to claim 2 wherein said label descriptive terms comprise mathematically related physical parameters.

* * * * *